Figure 6:
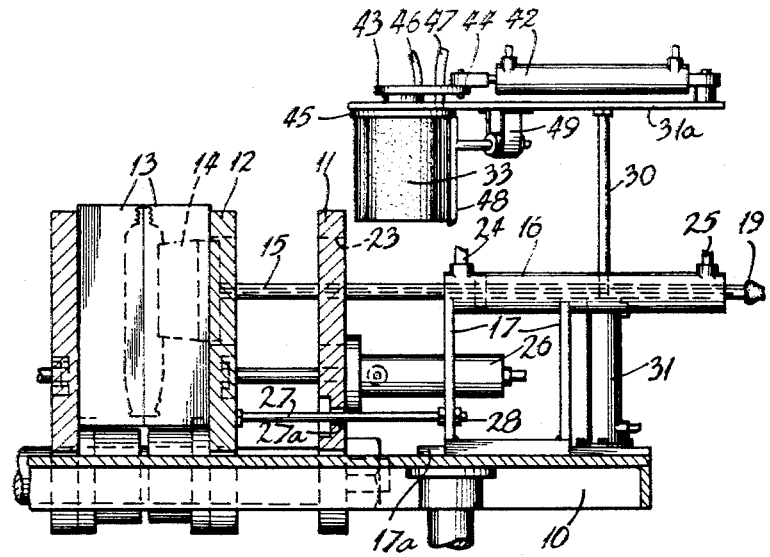

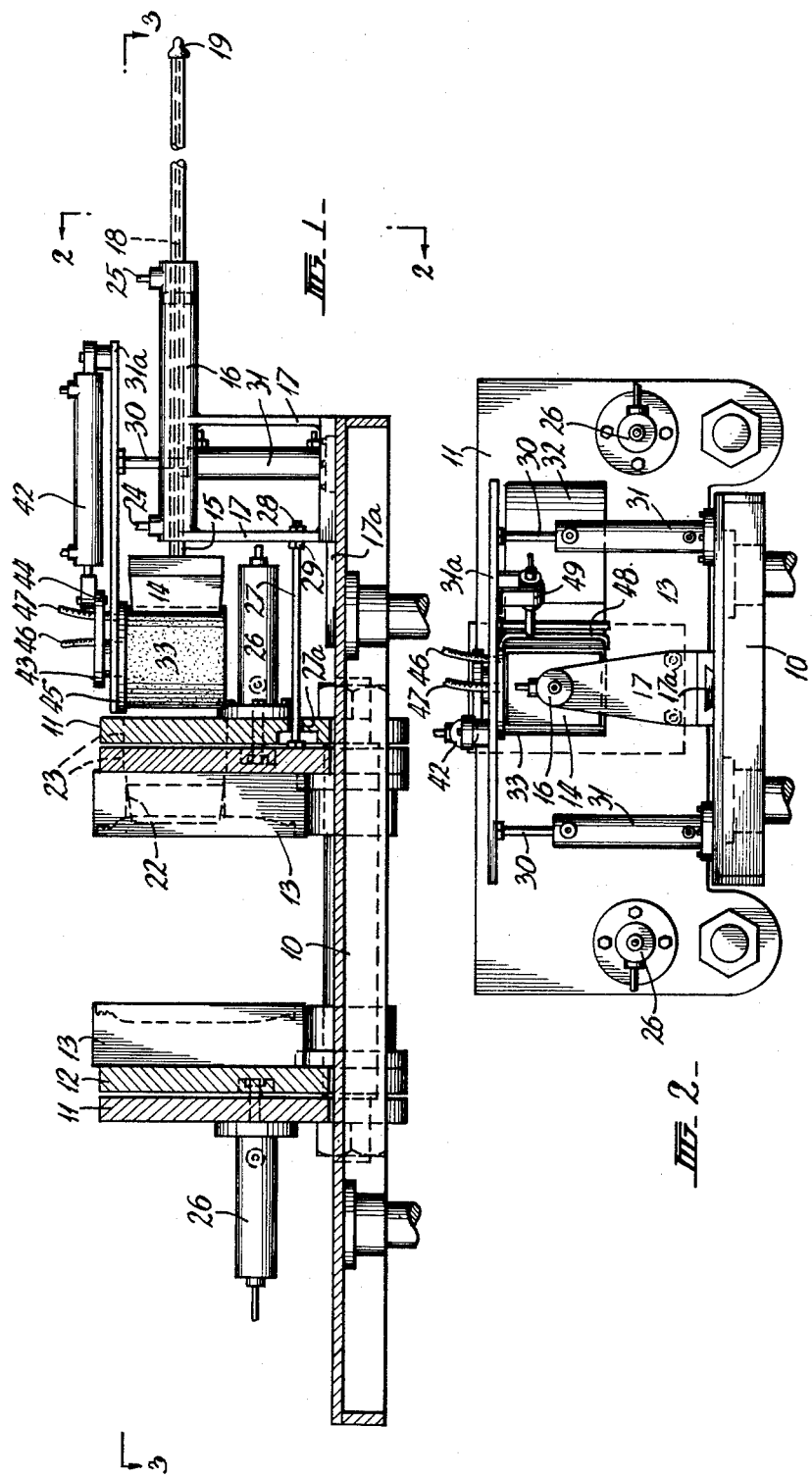

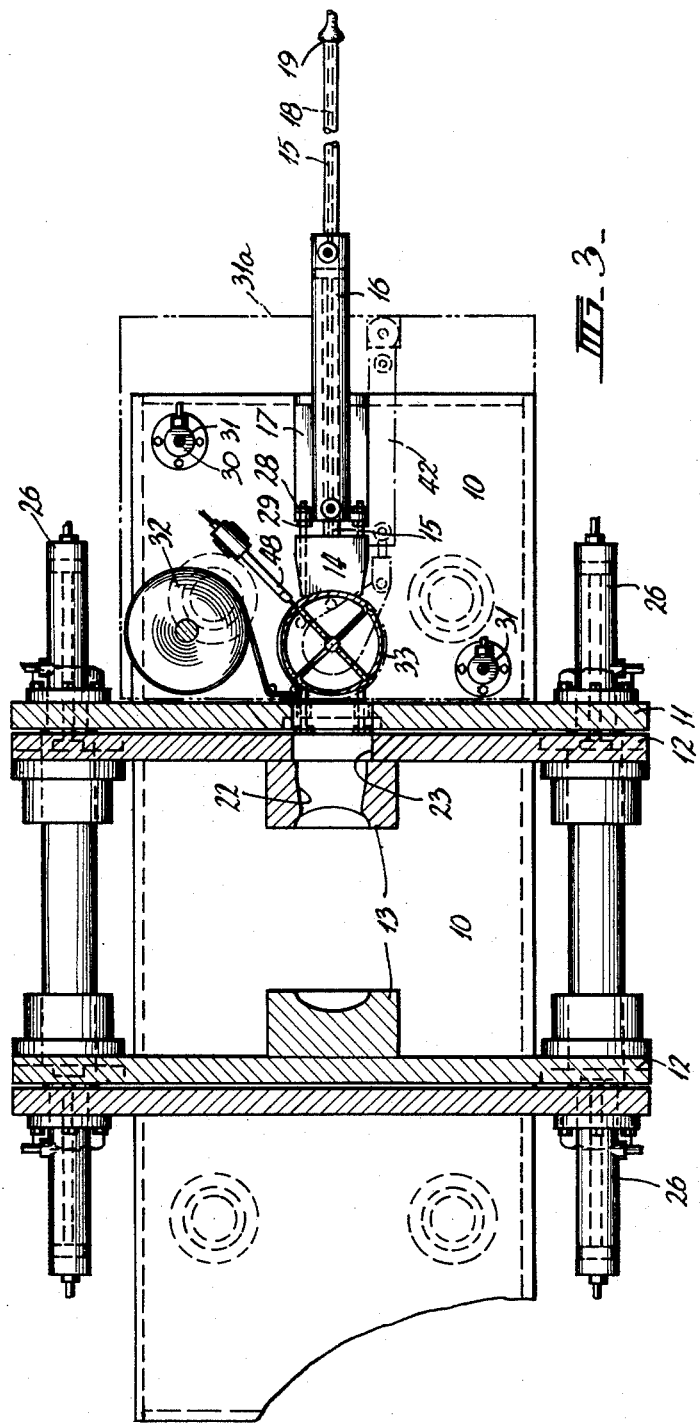

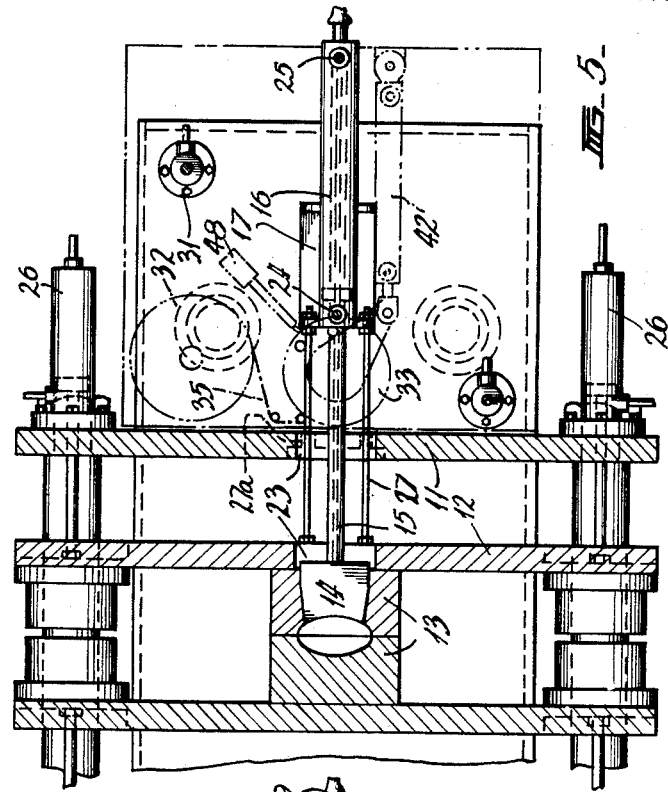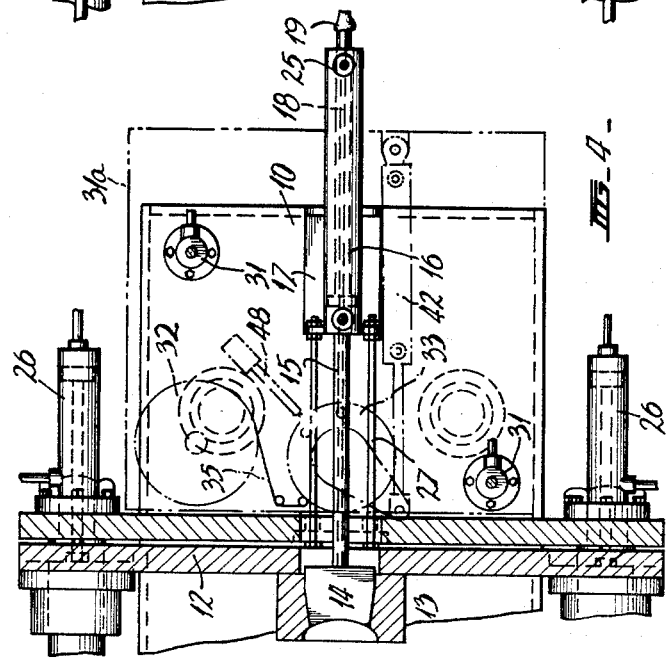

United States Patent Office 3,151,193
Patented Sept. 29, 1964

3,151,193
APPLYING PRINT TO BLOWN PLASTIC ARTICLES
Geoffrey Kaye Stewart Thornton, Surrey Hills, Victoria, Australia (Coonawana Canterbury Road, Maidstone St., Ringwood, Victoria, Australia)
Filed June 19, 1962, Ser. No. 203,534
Claims priority, application Australia, June 20, 1961, 6007/61
17 Claims. (Cl. 264—94)

This invention relates to the printing of plastic articles and refers more particularly to a method and apparatus for applying printed matter to plastic articles such as bottles and the like formed by blow moulding.

Most, if not all, blown plastic containers have the printed matter applied subsequently to the blow moulding process and this creates quite a problem in that it is very difficult and in fact on many occasions, impossible, to effectively print containers, particularly containers of unusual or irregular shape. One of the greatest problems arising from this is that the container must be handled on numerous occasions if it is printed in multi-colour, as each colour must be dried before the next is applied. Apart from the not always satisfactory results obtained with such printing methods, they are not economically acceptable as each colour should be allowed to dry for twenty-four hours. Thus, when printing in multi-colour it may take at least several days to print the containers. This, of course, then presents problems of re-handling and also of storage.

A further disadvantage encountered with existing methods of printing is that the printed matter often cracks or flakes off "squeeze" type containers owing to repeated use and this is most unsatisfactory to the manufacturers whose goods are contained therein, and possibly also to the user, who may have difficulty in the identification of one container from another. Also, the contents of the containers sometimes have detrimental effect on the printed matter making it illegible.

It is an object of the present invention to provide a method of printing blown articles whereby the aforesaid problems are overcome.

It is also an object of the invention to provide apparatus for applying printed or artistic matter to blown plastic articles in such manner that the print is long lasting.

Another object of the invention is to provide a blown plastic article to which printed matter has been applied in such manner that the continued use of the article will not substantially affect the printed matter thereon.

Accordingly, the present invention resides in a method of applying printed matter to blown plastic articles comprising the steps of removing at least part of a die in which the article is to be formed, applying printed polythene film to the inner face of said removed part of the die, replacing said removal part of the die with film applied thereto in the die body, delivering a charge of plastic to the die, closing the die and blowing the article.

The invention also resides in apparatus for applying printed matter to blown plastic articles, comprising a die at least portion of which may be withdrawn from the die body, means for applying printed polythene film to said withdrawn portion of the die, means for delivering a charge of plastic material to said die, means for closing the die and blow means for forming the article.

The invention further resides in a blown printed plastic article formed in accordance with the aforesaid method and/or by the aforementioned apparatus.

In the description of the present invention the term "printed" is intended to include printed or artistic design work in mono- or multi-colour, and the term "plastic" includes polythene or other plastic material suitable for forming blow moulded articles.

Figure 7:
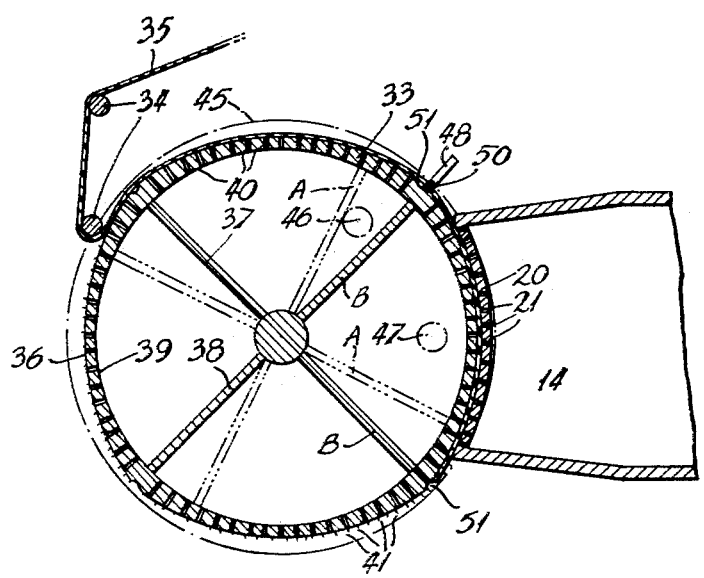

The invention will be better understood, and other objects and features will become apparent from the ensuing description, wherein reference is made to the accompanying drawings in which:

FIGURE 1 is a sectional side elevational view of the print applying apparatus of the present invention, FIGURE 2 is an end elevational view taken along the line 2—2 of FIG. 1, FIGURE 3 is a plan view of the apparatus taken along the line 3—3 of FIG. 1 wherein portion of the die is withdrawn from the die body, FIGURE 4 is a plan view of the apparatus showing the die section in position in the die body and with the platten in the open position, FIGURE 5 is a plan view similar to FIG. 4, but wherein the platten is in the closed position, FIGURE 6 is a sectional side elevational view similar to FIG. 1, but wherein the tape feeding mechanism is in the raised position, and FIGURE 7 is an enlarged sectional plan view of the labelling drum.

Referring now to the drawings, the apparatus comprises a main table 10, on which is mounted a fixed platten 11 and the usual moving platten 12 and mould 13. For simplicity, only one half of the machine will be referred to as the apparatus is repeated on the other half. Although the apparatus as mentioned comprises the usual fixed and moving plattens and die, there is some modification from those used hitherto. The die 13, which as shown in FIGS. 1 and 3 is suitable for forming an oval shaped bottle, has portion 14 thereof removable. The die portion 14 is affixed to the end of an hydraulic piston 15, the cylinder 16 of which is supported on the main table 10 by a pair of brackets 17. The piston 15 has an axial passage 18 therein, the inner end of which communicates with the die portion 14, which is hollow (see FIG. 7) and the outer end of which is connected to a vacuum line 19 which is connected to a vacuum pump (not shown).

The curved inner face 20 of the die portion 14 is provided with numerous passages 21 of exceedingly small diameter. The purpose of the passages will be hereinafter described. The inner end of the die portion 14 is tapered so as to provide an airtight fit with the correspondingly shaped opening 22 in the die 13.

In order to remove the die portion 14 from the die 13, the moving platten 12 and fixed platten 11 are each provided with an opening 23 therein through which the die portion 14 is retracted and returned. The hydraulic piston 15 and cylinder 16 are double acting, the connections 24, 25 being coupled to an hydraulic system and valves (not shown). The moving platten 12 is also actuated by a pair of double acting pistons and cylinders 26, the cylinders being affixed to the fixed platten 11.

A pair of rods 27 are affixed at one end to the moving platten 12 and at the other end by a nut 28 and lock nut 29, to one of the brackets 17. The rods 27 pass through openings 27a in the fixed platten 11 and the brackets 17 are mounted on guides 17a. In this manner, when the moving platten 12 is moved forwardly to close the die 13, the rods 27 move the brackets 17 forwardly a corresponding distance on the guides 17a.

A pair of vertically arranged double acting pistons 30 and cylinders 31 are affixed to the main table 10. The pistons 30 carry at their upper ends, a table 31. The table 31 carries on its underside, a reel of polyethylene tape film 32 and a tape transfer or labelling drum 33. A pair of guide pins 34 for guiding the tape 35 in its transference from the reel 32 to the drum 33, are also carried on the underside of the table 31. The reel 32 is freely rotatable so that there is no stretching force exerted on the tape 35 during its transfer to the drum.

As will be seen from FIG. 7, the drum 33 is divided into quadrants, each of which is completely separate from the adjacent quadrant. The outer periphery of the drum 33 is so shaped that the arc 36 between divisions 37, 38 is that of a circle of substantially greater radius than that of the inner surface 39 of the drum. This enables the drum to present a surface of lesser curvature for contact with the die portion 14 without increasing the overall diameter of the drum 33.

The peripheral wall of the drum 33 is provided with numerous minute passages 40, similar to the passages 21 in the die portion 14. The outer surface of the drum 33 is also provided with fine short pins 41. The pins 41 are arranged so as to pierce the tape 35 as it passes from the guide pins 34 to the drum and to locate said tape on the drum 33. As the drum 33 is rotated, the pins piercing the tape 35 causes the tape to unwind from the reel 32 and pass around the guides 34 onto the drum 33.

The drum 33 is caused to rotate in a clockwise direction by means of a trunnion-mounted double-acting air cylinder 42, the piston of which is pivotally attached to a sprag clutch 43. The cylinder, piston and sprag clutch are adjusted so that on each operation, the drum 33 is caused to rotate precisely one quarter of a full revolution. On the return stroke of the piston, the clutch allows the crank arm 44 to move anti-clockwise without moving the position of the drum 33.

The top of the drum 33 is provided with a housing 45 which forms an airtight seal with the top of said drum. The housing 45 remains stationary and the drum 33 rotates therein. The housing 45 is provided with a pair of vacuum leads 46, 47 which are arranged to create a vacuum in one quadrant at a time. The vacuum line 46 is under constant vacuum whilst vacuum is applied through the line 47 intermittently. The bottom of the drum 33 is closed.

A solenoid operated hot wire cutting device 48 is carried by a bracket 49 on the underside of the table 31a. The device 48 is substantially U shape and the wire 50 is carried between the ends thereof.

The drum 33 is provided with longitudinal channels 51 which extend the full length of the drum. These channels are arranged in radial alignment with the divisional walls separating the quadrants.

The tape 35 has the printed matter applied in such manner that the arcuate distance between the channels 51 corresponds with one complete label. Each label on the tape 35 is separated from the next by a narrow unprinted strip, the width of which is substantially equal to the width of the channel 51, so that when the electrical circuit controlling the solenoid is caused to close, the solenoid operated wire 50 is heated and by its heat and expansion the wire tends to seat in the channel 51 thereby cutting the tape 35.

In operation, a bottle or the like having printed matter thereon is formed as follows:

When the printed film 35 has been transferred to the die portion 14 as will be now described, the hydraulic fluid is caused to enter into the lower end of the vertically arranged cylinder 31 thereby causing the piston 30 to raise the table 31a and thereby raising the reel 32 and drum 33.

As soon as the table 39 is raised to its uppermost position, the piston 15 is caused to move forwardly in the cylinder 16 and consequently the die portion 14 is moved forwardly through the openings 23 in the fixed and moving plattens 11 and 12 respectively into the recess 22 in the die body 13 where it forms an airtight fit. The die portion 14 is so shaped that when in place in the die body 13, the contour of the die is completed.

When the die portion 14 has been positioned in the die body 13, the pistons and cylinders 26 are brought into operation through suitable valves in the hydraulic system to move the moving plattens 12 and die halves 13 carried thereon, together thus closing the die. During the closing of the die, the parison of extruded plastic is delivered in the usual way and when closed, blowing is effected.

Due to the fact that the rods 27 connect the moving platten 12 with the brackets 17 which carry the cylinder 16, as the platten 12 moves forwardly, so also does the cylinder 16 move forwardly on guides 17a. By this arrangement the piston 15 is caused to maintain the die portion 14 in position in the die body 13.

Simultaneously with the operation of the aforementioned integers which are concerned with the blow moulding operation, the apparatus carried by the raised table 31a also operates as follows:

When the table 31a is moved by the piston 30 to its uppermost position, air is delivered to the trunnion-mounted air cylinder 42 causing the piston to move the crank arm 44 in a clockwise direction and through such distance as to cause the drum 33 to perform one quarter of a revolution.

As the drum 33 is rotated the tiny pins 41 on the surface thereof penetrate the printed tape 35 which is freely withdrawn from the reel 32 and position said tape on the surface of the drum 33. At the same time, the tape positioned on the drum during the previous cycle, is rotated through another quarter revolution thus placing it in a position ready for transfer to the die portion 14 when the table 31a is lowered.

Referring to FIG. 7, it will be seen that as the drum 33 is rotated the pins 41 pick up the tape passing around the second guide pin 34 and hold said tape to said drum. The tape 35 is held to the drum solely by the pins 41 until the wall 37 reaches the position shown in chain lines at the vacuum port 46. When the quadrant is in communication with the vacuum port 46, which is under constant vacuum, all air is extracted from that particular quadrant and the tape 35 is drawn flat against the wall of the drum 33 through the agency of the small passages 40, thereby eliminating the likelihood of wrinkles and/or air bubbles. When the quadrant is in the position shown as A—A it is in communication with both vacuum ports 46 and 47, both of which are under vacuum. When the quadrant is in the transfer position, shown as B—B, it is in communication with vacuum port 47 only.

After the drum has been rotated through its quarter revolution and the tape has been placed in the transfer position, the electrical circuit caused the solenoid to actuate the hot wire 50 thereby severing the tape in radial alignment with the dividing wall between quadrants.

Also, after the crank arm 44 has been moved by the trunnion-mounted piston and cylinder 42, air is delivered to the forward end of the cylinder 42 causing the piston to return and simultaneously returning the crank arm 44. The return of the crank arm 44 is permitted by the provision of the sprag clutch 43.

After the blow moulding operation is completed, the dies are opened by operation of the pistons and cylinders 26 and the die portion 14 is withdrawn through the medium of the piston 15, after the moving platten has returned to its open position.

When the die portion 14 is fully retracted, the piston 30 and cylinder 31 causes the table 31a to be lowered, thereby placing the drum in front of, and in near contact with, the curved face 20 of the die portion 14. Immediately the drum is positioned in front of the die portion 14, vacuum is applied to the line 19 passing axially through the piston 15 to the die portion 14, thereby extracting all air from the die portion 14. Simultaneously, the vacuum which had been maintained on the tape bearing quadrant of the drum 33, through the port 47, is interrupted thus causing the tape to be transferred from the drum to the die portion 14. As soon as the transfer has been effected, the piston 30 and cylinder 31 are again caused to raise the table 31a for the next tape positioning operation.

The die portion 14 is maintained under vacuum until the die portion is positioned in the die body 13 and the blowing operation commences. Thus, the tape 35 is held in the correct position until the bottle is blown.

In the blow moulding operation, the heat of the parison is sufficient to cause the printed polythene tape to be welded or fused into the blown plastic and the small holes which were created in the film by the pins 41 enable any air which may have been accidentally entrapped, to be dispelled.

It will thus be seen that the article thus formed by the present invention includes the label or printed matter as part of the article and the risk of damage to the printed matter is substantially eliminated.

The printed matter is preferably applied to the polythene film by a flame printing process which results in the print being fused into the polythene and this together with the fusing into the blown article presents an article with a pleasing and durable label. However, the print could be applied to the tape by any other known suitable method.

By modification of the invention the apparatus may be adapted for printing a small portion of an article or for printing the entire surface of the article and thus we do not wish to be limited to the positive terms employed in this description. Similarly, by suitable adaption of the drum 33 and die portion 14, the invention could be used equally as effectively to print irregular shaped articles.

I claim:

1. A method of applying printed matter to blown plastic articles, comprising the steps of transferring printed polythene tape from a reel of printed tape to a labelling drum which is divided into quadrants, the arcuate surfaces of which are provided with minute radial passages and each quadrant being provided with an airtight seal from the adjacent quadrants, rotating said labelling drum through a quarter revolution thereby applying to said drum a length of polythene tape equivalent to the arc of one quadrant and simultaneously advancing one further quarter revolution, tape applied to the drum in the preceding operation, applying vacuum to the two quadrants bearing the printed tape on their arcuate surfaces, cutting the tape in radial alignment with the division between said two quadrants, retracting part of a die from a die body, placing said labelling drum at least substantially in contact with the die face of said removed die part so that the tape which has been advanced a second quarter revolution is adjacent the face of said removed die part which is provided with minute passages which communicate the face of said die part with the interior of said die part, releasing the vacuum in the quadrant bearing the said advanced tape and simultaneously applying vacuum to the interior of said die part, thereby causing the tape to be transferred from the labelling drum to the face of the removed die part, removing the labelling drum, replacing said removed die part with film held thereto by the vacuum in said die part, in the die body, delivering a charge of plastic to the die, closing the die and simultaneously with the blowing of the article, releasing the vacuum in the die part.

2. A method as claimed in claim 1 wherein the labelling drum and tape reel are carried on a movable table which is lowered to position the drum at least substantially in contact with the face of the removed die part and which is raised to clear the path of movement of the die part.

3. A method as claimed in claim 2 wherein the labelling drum is rotated to position the tape thereon whilst the table is in the raised or uppermost position.

4. A method as claimed in claim 1 comprising the further step of providing the peripheral surface of the labelling drum with small pins which during the first quarter revolution of the labelling drum, lead the tape from the reel and position it on the surface of said drum.

5. A method as claimed in claim 4 wherein the holes formed in the tape by the pins enable any air which is accidentally entrapped prior to the blowing operation to be dispelled during the blowing operation.

6. A method of applying printed matter to blown plastic articles, comprising the steps of transferring printed polythene tape from a reel of printed tape to a labelling drum, both said reel and drum being carried by a table movable in a vertical direction, said drum being divided into quadrants, the arcuate surfaces of which are provided with minute pins and radial passages, each quadrant being provided with an airtight seal from the adjacent quadrants, rotating said labelling drum through a quarter revolution whereby the pins on the surface of the drums penetrate the tape passing from the reel and apply a length of polythene tape equivalent to the arc of one quadrant to the surface thereof and simultaneously advancing one further quarter revolution, tape applied to the drum in the preceding operation, applying vacuum to the two tape bearing quadrants, operating a solenoid controlled hot wire cutting device to cut the tape in radial alignment with the division between the two said tape bearing quadrants, retracting part of a die from a die body by means of a horizontally disposed hydraulic piston, lowering said table to position the labelling drum at least substantially in contact with the face of said retracted die part so that the tape which has been advanced a second quarter revolution is adjacent the face of said die part which is provided with minute passages which communicate the face thereof with the interior of said die part, releasing the vacuum in the quadrant bearing the said advanced tape and simultaneously applying vacuum to the interior of the removed die part, thereby causing the tape to be transferred from the labelling drum to the face of the removed die part; raising the table to clear the path of movement of the die part, replacing said removed die part with film held thereto by the vacuum in the said die part, in the die body, delivering a charge of plastic material to the die, closing the die and simultaneously with the blowing of the article, releasing the vacuum in the die part.

7. Apparatus for applying printed matter to blown plastic articles comprising a reel of printed polythene film, a labelling drum including means for transferring the film from said reel to said drum; an hydraulic piston for removing part of a die body, means for situating the labelling drum substantially in contact with the die face of said removed die part, vacuum means for transferring the printed film from said drum to the face of said removed die part, means for removing said labelling drum from the path of movement of the die part and its associated piston, vacuum means for holding the film against the face of the die part while the piston returns the die part to the die body and while a plastic charge is delivered to the die and the die is closed for the blowing operation, the vacuum means being discontinued simultaneously with the blowing operation, said labelling drum being substantially cylindrical and divided into quadrants, each of which is provided with an airtight seal from the adjacent quadrant, each quadrant having arcuate surfaces and minute radially projecting pins on said surfaces which penetrate the film and act as drive means for winding the tape from the reel and transferring the tape to the drum.

8. Apparatus as claimed in claim 7 wherein the labelling drum is rotated through a quarter revolution during each blowing operation thereby causing the pins to transfer a length of film equal to the arcuate curvature of one quadrant.

9. Apparatus for applying printed matter to blown plastic articles comprising a reel of printed polythene film, a labelling drum including means for transferring the film from said reel to said drum; an hydraulic piston for removing part of a die body, means for situating the labelling drum substantially in contact with the die face of said removed die part, vacuum means for transferring the printed film from said drum to the face of said removed die part, means for removing said labelling drum from the path of movement of the die part and its associated piston, vacuum means for holding the film against the face of the die part while the piston returns the die part to the die body and while a plastic charge is delivered to the die and the die is closed for the blowing operation, the vacuum means being discontinued simultaneously with the blowing operation, said labelling drum being substantially cylindrical and divided into quadrants, each of which is provided with an airtight seal from the adjacent quadrant, each quadrant having arcuate surfaces and minute radially projecting pins on said surfaces which penetrate the film and act as drive means for winding the tape from the reel and transferring the tape to the drum, said labelling drum being provided with a plurality of radial passages about the periphery thereof, said passages communicating with the interior of the drum.

10. Apparatus as claimed in claim 9 characterized in that the reel and labelling drum are carried on the underside of a vertically movable table, said table being raised and lowered by a double-acting hydraulic piston.

11. Apparatus as claimed in claim 10 characterized in that the movable table carries on its upper side, a trunnion-mounted piston and cylinder, the piston being connected to a crank arm in such manner that on each outward stroke of the piston, the crank arm causes the labelling drum to rotate through a quarter revolution.

12. Apparatus as claimed in claim 11 characterized in that the drive from the crank arm to the labelling drum is through a sprag clutch which permits the crank arm and piston to perform their return stroke without altering the position of the labelling drum.

13. Apparatus for applying printed matter to blown plastic articles comprising a reel of printed polythene film and a labelling drum carried on the underside of a table movable vertically by a double-acting hydraulic piston, said labelling drum being divided into quadrants, the arcuate surfaces of which are provided with minute pins and radial passages and each quadrant being provided with an airtight seal from the adjacent quadrants; a trunnion-mounted double-acting pneumatic piston carried on the upper side of said movable table, the free end of the piston being pivotally connected to a crank arm in such manner that each outward stroke of the piston moves the crank arm, which through the agency of a sprag clutch, rotates the labelling drum one quarter of a revolution, thereby causing the minute pins on the surface of the drum to penetrate the film passing from the reel and apply a length of the polythene film equivalent to the arcuate curve of one quadrant, to the surface of said quadrant, and simultaneously advancing tape applied to the drum during the preceding quarter revolution, a further quarter revolution; a fixed housing closing the upper end of the labelling drum, said housing being provided with two spaced vacuum ports communicating with a vacuum source, said ports being so placed that vacuum may be applied to the two film bearing quadrants; a solenoid operated hot wire cutting device carried on the underside of said movable table, said wire being arranged to cut the film at a position in radial alignment with the division between the tape bearing quadrants after the drum has been rotated; an hydraulically operated double-acting piston horizontally supported above a main table, the forward end of said piston being affixed to the rear of a retractable die portion which is removable from the side of a die body, said piston being adapted to retract the said die portion a distance from the die body sufficient to enable the movable table to be lowered to position the labelling drum in contact or in near contact with the face of the die portion; means for interrupting the vacuum in the quadrant of the drum adjacent said die portion and for simultaneously applying vacuum to the die portion, the face of which is provided with a plurality of minute passages communicating with the interior of said die portion, whereby the film on the adjacent quadrant of the labelling drum is transferred to the die portion, said vacuum means being maintained on the die portion whilst the double-acting hydraulic piston returns the die portion to the die body and whilst the die is closed for the blow moulding operation, said vacuum means being released in the die portion simultaneously with the blow moulding operation.

14. Apparatus as claimed in claim 13 characterized in that the piston attached to the die portion is provided with an axial passage which communicates the interior of the die portion with vacuum means whereby vacuum may be applied to the face of the die portion.

15. Apparatus as claimed in claim 14 characterized in that the double-acting piston for retracting the die portion is supported on brackets which are slidable on guide tracks on the main table of the apparatus towards and away from the die body.

16. Apparatus as claimed in claim 15 characterized in that the retractable die portion is retracted by the piston through openings in the fixed and movable plattens.

17. Apparatus as claimed in claim 16 characterized in that the piston support brackets are attached to the moving platten whereby as the moving platten moves, the brackets and piston carried thereby move a corresponding distance in the same direction.

References Cited in the file of this patent

UNITED STATES PATENTS

| | | |
|---|---|---|
| 1,744,438 | Benson | Jan. 21, 1930 |
| 2,523,234 | Rado | Sept. 19, 1950 |
| 2,632,202 | Haines | Mar. 24, 1953 |
| 2,811,744 | Baldanza | Nov. 5, 1957 |
| 2,922,192 | Morin | Jan. 26, 1960 |
| 2,959,812 | Allen | Nov. 15, 1960 |